(12) United States Patent
Paolilli et al.

(10) Patent No.: US 11,884,838 B1
(45) Date of Patent: Jan. 30, 2024

(54) SOFT MATTE NON-SILICONE FILM

(71) Applicant: TORAY PLASTICS (AMERICA), INC., North Kingstown, RI (US)

(72) Inventors: Tracy Paolilli, North Kingstown, RI (US); Joshua Cloutier, North Kingstown, RI (US); Yu Abe, North Kingstown, RI (US); Samuel Hogan, North Kingstown, RI (US)

(73) Assignee: TORAY PLASTICS (AMERICA), INC.

( * ) Notice: Subject to any disclaimer, the term of this patent is extended or adjusted under 35 U.S.C. 154(b) by 0 days.

(21) Appl. No.: 17/860,072

(22) Filed: Jul. 7, 2022

(51) Int. Cl.
*C09D 175/14* (2006.01)
*B29C 55/14* (2006.01)
*C09D 167/02* (2006.01)
*B29L 7/00* (2006.01)
*B29K 67/00* (2006.01)

(52) U.S. Cl.
CPC .......... *C09D 175/14* (2013.01); *B29C 55/143* (2013.01); *C09D 167/02* (2013.01); *B29K 2067/00* (2013.01); *B29L 2007/008* (2013.01)

(58) Field of Classification Search
None
See application file for complete search history.

(56) References Cited

U.S. PATENT DOCUMENTS

| | | | | |
|---|---|---|---|---|
| 5,104,721 A | * | 4/1992 | Sun | G03G 7/0006 428/206 |
| 5,270,103 A | * | 12/1993 | Oliver | B41M 5/5254 428/419 |
| 5,853,965 A | | 12/1998 | Haydock et al. | |
| 5,910,359 A | * | 6/1999 | Kobayashi | B41M 5/52 428/207 |
| 9,845,414 B2 | | 12/2017 | Wieneke et al. | |
| 2002/0182376 A1 | * | 12/2002 | Mukherjee | B41M 5/506 428/32.24 |
| 2007/0036909 A1 | * | 2/2007 | Luo | B05D 7/04 427/532 |
| 2009/0239057 A1 | * | 9/2009 | Quintens | B41M 5/52 428/313.5 |

FOREIGN PATENT DOCUMENTS

| | | | |
|---|---|---|---|
| EP | A 0322771 A2 | * | 7/1989 |
| JP | 2014065817 A | | 4/2014 |
| JP | 6424211 B2 | | 11/2018 |

* cited by examiner

*Primary Examiner* — Ramsey Zacharia

(74) *Attorney, Agent, or Firm* — Dave Law Group LLC; Raj S. Dave

(57) ABSTRACT

The present invention relates to a polymeric film, which may have but is not limited to Biaxially oriented polyester, polypropylene & polylactic acid that has a soft-touch matte coating applied via an in-line coating process. This film also has an increased coefficient of friction of this surface, with a total thickness from 5 to 80 μm. The film of this invention has excellent suitability as external packaging bags with an excellent matte appearance and soft haptic feel which, when the bags are stacked A side to A side (A side being coated), are not subject to slippage between the same. At the same time, this film has also low friction with metal, so it is easy to handle the film in the film making process which contributes to the excellent productivity.

21 Claims, 2 Drawing Sheets

SOFT MATTE NON-SILICONE FILM

FIELD OF THE INVENTION

This invention relates to a film with excellent suitability as an external packaging with a matte appearance and a soft feeling surface that is pleasing to the consumer. 'Soft feeling' refers to a finishing method that imparts a velvety texture to printed materials. This soft-feel coating formulation containing polyvinyl pyrrolidone (PVP) on the A-side (aka "coated side" or the surface of the film which receives the soft-feel coating) of the film that provides the consumer with a non-silicone, slip-free packaging film which not only has the desirable haptic properties, but also provides lower gloss, improved hot melting glue adhesion & a minimal surface energy change of less than or equal to 5% on the uncoated side (B side) of the film even after the Corona treatment. Hot melting glues tend to have a high degree of polarity. By incorporating the PVP into the soft matte coating it provides additional polarity to the A-side coated film. Not being bound by any theory, it is believed that PVP strengthens the polar-to-polar bonds between the glue and the coated film.

BACKGROUND OF INVENTION

Pinch Bottom Fold & Glue Bags are used for larger size pet food bags 25 to 50 pounds each in weight. In the case of pet food, pet owners do not build a firsthand experience with the product inside. The taste, crunch and chew are not something the consumer is going to experience. Therefore, packaging must be created with value: a bag that implies high quality and freshness is desirable, so that pet owners are reminded of a particular brand and its value at each meal. This is often carried out with a soft matte haptic bag.

In the case of large laminate food bags, pet food is commonly sold in Pinch-Bottom Bags: Pinch-bottom bags can be produced with or without fold-over bottoms and are ideal for larger-volume packages. Because large bags are often housed on the bottom shelf, this is to optimize the bottom 3 to 4 inches of the face, which is a focus for consumers from this vantage point.

It is challenging to seal bags with a soft matte coating that contains waxes or silicones in the fold-over bottom applications which require the coated side of the film to adhere to hot melt glue. It can also be challenging to stack bag upon bag without having the bags slip off one another. The advantages of using silicone in these types of coatings are that it is a proficient additive for controlling COF and improving the haptic feel. The disadvantages, however, are that the silicone tends to migrate to the surface of the coated film, and the silicone can transfer onto the uncoated B-side of the film, thereby reducing the surface energy required for printing.

U.S. Pat. No. 10,940,667 B2 describes a polyester film that is matte on at least one side and has an increased coefficient of friction from 0.4 to 1.6 with high gloss from 10 to 50 GU (gloss units) and low haze below 60%. The outer layer comprises particles with d50 from 2.0 to 10 um and the coating layer has been applied to the matte outer layer and the coating thickness is very thin (20 nm to 250 nm).

EP0678378 describes a multilayer polyethylene film with gloss not above 50 GU and with a coefficient of friction below 0.5. However, the use of polyethylene films reduces the mechanical strength of the packaging, and it restricts the maximum temperature to about 100° C.

EP 1442875 describes a polyester film with a matte surface. However, by virtue of the particles used polyester films with a matte surface have a good slip, i.e., low coefficient of friction. The combination of matte film surface with a high coefficient of friction, therefore, represents a contradiction. A film as described in EP1442875 is therefore unsuitable for use as the packaging with good stackability and low susceptibility to slippage.

EP 0903221 describes a polyester film with good optical properties, good processability, and good oxygen barrier after coating with a metallic or oxidic material. These films have an increased coefficient of friction, but the film structure invention gives the film high gloss, which is unsuitable for a low gloss packaging application.

U.S. Ser. No. 11/213,996 B1 describes an inline method for preparing polymeric films that provides a soft-feel polymeric film with the advantage of reduced coat weight, along with excellent adhesion.

U.S. Ser. No. 11/213,996 B1 contains silicone, which tends to migrate to the printable, backside (Side B) of the film, thereby reducing the surface energy required for printing.

There is a need for a soft matte coating that, when applied to a polyester or polypropylene B film, is nonmigratory and silicone-free, has the desirable 60° gloss less than 10 GU (gloss units) and adheres well to hot melt glues.

SUMMARY OF INVENTION

An embodiment relates to a processing of a soft-feel polyester or polypropylene film includes the continuous, sequential steps of: (a) forming a polymer core layer; (b) optionally adding an adhesive layer and/or a skin layer over the polymer core layer to make a base layer; (c) stretching the core layer or base layer, preferably uniaxially in the machine direction; (d) coating the core layer or base layer with a liquid solution of a soft-feel coating (comprising a polyurethane, an acrylic or a mixture of both a polyurethane and an acrylic, further comprising dulling and/or matting agents), polyvinyl pyrrolidone (PVP) and crosslinker; (e) heating the coated core layer or base layer effectively to dry and crosslink the soft-feel coating solution to form a soft-feel layer contiguously upon the core layer or base layer to create a coated film; (f) optionally stretching the composite soft-feel coated film in the transverse direction during or immediately following the drying and cross-linking step, and (g) optionally heat-setting the composite soft-feel coated film to anneal the composite soft-feel coated film to minimize thermal shrinkage effects and produce a thermally stable composite film. If an adhesive layer is present as a component of the base layer, the step (d) coating is applied to the surface of the adhesive layer.

In the present application, the silicone is replaced with polyvinyl pyrrolidone (PVP) which not only provides further improved glue adhesion & lower gloss. It is also silicone free and does not affect the B side surface energy of the film.

In an embodiment, the soft feel coating preferably is formed by mixing a combination of aqueous polyurethane, acrylic, wax dispersion, organic and or organic matting agents, PVP and crosslinker.

In one embodiment, the polymeric core layer film or base layer film is stretched in the machine direction from about 300% to about 600% (i.e., from 3 times to 6 times the original dimension) for biaxially oriented polypropylene (BOPP), or from about 300% to about 400% (i.e., from 3 times to 4 times the original dimension) for biaxially oriented polyester (BOPET). Then, prior to any other stretching (e.g. transverse orientation) of the film, the coating is applied to a surface of the polymeric core layer film or base layer film.

After the soft-feel coating is applied, the coated film may be stretched in the transverse direction; while stretching the coated composite film from about 300-1000% (i.e., from 3 times to 10 times the original dimension) for BOPP, or from about 300-480% (i.e., from 3 times to 4.8 times the original dimension) for BOPET in the transverse direction, the coated composite film is heated to orient the base layer polymer and dehydrate any water of solution from the coating composition. Heating during solvent evaporation, substrate layer polymer orientation, and/or annealing can also advance crosslinking of the coating, minimize thermal shrinkage and produce a thermally stable composite film.

In an embodiment, a polymeric film made by the inventive method may form a food contact material or a package for indirect contact with foods.

In an embodiment, the addition of polyvinyl pyrrolidone (PVP) into the coating improves hot melt glue adhesion to the coated substrate and provides lower gloss.

In an embodiment, a film comprising: a layer comprising a core layer comprising a biaxially stretched film-forming polymer having polyesters and a top layer on the core layer, wherein the top layer comprises urethane, polyvinyl pyrrolidone (PVP), and a crosslinker; wherein a surface gloss of the film measured on the top layer at 60° angles according to ASTM D523 is equal to 4-12.

In an embodiment, the film further comprises a coating of a hot melt adhesive, wherein the hot melt adhesive has a cohesive split of 50/50% with the film, when about 1 gm of the film is coated with about 1/16 inch wide, 0.25 g melt beads of the hot melt adhesive at 370° F.

In an embodiment, the PVP having Fikentscher K value in the range from 17 to 90.

In an embodiment, a difference in a surface energy of the film and the core layer is equal to or less than 5%.

In an embodiment, the film has a coefficient of static ($\mu s$) and a dynamic friction ($\mu d$) in the range of about 0.3-1.0.

In an embodiment, the top layer further comprises silica.

In an embodiment, the top layer is free of silicone.

In an embodiment, the film further comprises a skin layer, wherein the top layer, the core layer and the skin layer are in this order.

In an embodiment, the film has a haze percentage less than 90 and more than 75.

In an embodiment, a composition of the skin layer and the core layer is different.

In an embodiment, a composition of the skin layer and the core layer is same.

In an embodiment, the core layer further comprises an adhesive layer.

In an embodiment, the surface gloss is less than 10.

In an embodiment, the urethane particles have an average aspect ratio equal to or greater than 1.5.

In an embodiment, the core layer further comprises crystalline propylene homopolymers and/or high crystalline polypropylene homopolymers (HCPP).

In an embodiment, the urethane particles comprise an aliphatic water-borne polyurethane.

In an embodiment, A method comprising: Stretching a core layer comprising a biaxially stretched film-forming polymer longitudinally to form a first stretched layer; applying a coating mixture comprising urethane, polyvinyl pyrrolidone (PVP) and a crosslinker to the first stretched layer to form a coated layer; heating the coated layer; stretching the coated layer transversally to form a coated composite layer; wherein a top surface of the coated layer has a surface gloss at 60° of about 3 to 12.

In an embodiment, the coated layer comprises a quantity of from 0.6% to 9% by weight of silicon dioxide particles.

In an embodiment, the film further comprises a skin layer.

In an embodiment, the coating mixture is free of silicone.

BRIEF DESCRIPTION OF THE FIGURES

The foregoing summary, as well as the following detailed description of the invention, will be better understood when read in conjunction with the appended drawings. For the purposes of illustrating the invention, there are shown in the drawings embodiments which are presently preferred. It should be understood, however, that the invention is not limited to the precise arrangements and instrumentalities shown.

DETAILED DESCRIPTION

Definitions and General Techniques

Figure 1:
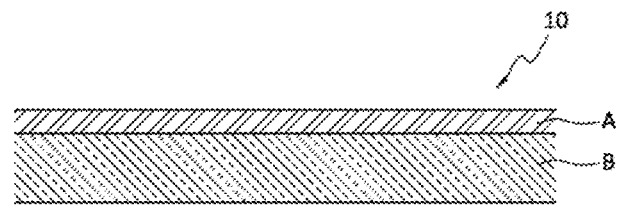
FIG. 1 is a schematic cross-sectional view of a film with a soft-feel coating applied on a polymeric base layer.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denotes the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The terms "couple," "coupled," "couples," "coupling," and the like should be broadly understood and refer to connecting two or more elements mechanically and/or otherwise. Coupling may be for any length of time, e.g., permanent or semi-permanent or only for an instant. The absence of the word "removably", "removable", and the like near the word "coupled", and the like does not mean that the coupling, etc. in question is or is not removable.

As defined herein, two or more elements are "integral" if they are comprised of the same piece of material. As defined herein, two or more elements are "non-integral" if each is comprised of a different piece of material.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value. At a minimum, such references that include a numerical parameter (e.g., approximately 5.1 cm) would include variations that, using mathematical and industrial principles accepted in the art (e.g., rounding, measurement or other systematic errors, manufacturing tolerances, etc.), would not vary the least significant digit (in the same example: 5.1.8 cm would be approximate, 5.2 cm would not be approximate).

Unless otherwise defined herein, scientific and technical terms used in connection with the present invention shall have meanings that are commonly understood by those of ordinary skill in the art. Further, unless otherwise required by context, singular terms shall include pluralities, and plural terms shall include the singular.

The methods and techniques of the present invention are generally performed according to conventional methods well known in the art and as described in various general and more specific references that are cited and discussed throughout the present specification unless otherwise indicated. The nomenclatures used in connection with, and the procedures and techniques of embodiments herein, and other related fields described herein are those well-known and commonly used in the art.

The following terms and phrases, unless otherwise indicated, shall be understood to have the following meanings.

The term, "polymer" means a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, although it is often used interchangeably with "interpolymer" to refer to polymers made from three or more different types of monomers or comonomers), terpolymers (which usually refers to polymers prepared from three different types of monomers or comonomers), tetrapolymers (which usually refers to polymers prepared from four different types of monomers or comonomers), and the like.

The term "polyester" is a category of polymers that contain the ester functional group in every repeat unit of their main chain. Examples of suitable polyester are but not limited to polyethylene terephthalate (PET), polyethylene naphthalate (PEN), polybutylene terephthalate (PBT), polytrimethylene terephthalate (PTT), bibenzene-modified polyethylene terephthalate (PETBB), bibenzene-modified polybutylene terephthalate (PBTBB), bibenzene-modified polyethylene naphthalate (PENBB), or a mixture thereof, preference being given to PET, PBT, PEN, and PTT, and also to their mixtures and copolyesters.

In an embodiment, polyester most commonly refers to a type called polyethylene terephthalate (PET).

The term, "Biaxially oriented film" is a film that is stretched in both machine and transverse directions, producing molecular chain orientation in two directions.

In an embodiment, a biaxially oriented film contains polyester and is called a biaxially oriented polyester film (BOPET).

In an embodiment, a BOPET film is produced by a tenter frame process, in which a thick extruded sheet is heated to its softening point (not to the melting point) and is mechanically stretched by 300-400%. Stretching in the tenter frame process is usually 4.0:1 in the machine direction and 4.0:1 in the transverse direction, although these ratios are fully adjustable.

The term "polypropylene", also known as polypropene, is a thermoplastic polymer used in a wide variety of applications. It is produced via chain-growth polymerization from the monomer propylene. Polypropylene belongs to the group of polyolefins and is partially crystalline and non-polar.

In an embodiment, a biaxially oriented film contains polypropylene and is called a biaxially oriented polypropylene film (BOPP).

The term "crystallinity" refers to the degree of structural order in a solid. In a crystal, the atoms or molecules are arranged in a regular, periodic manner. The degree of crystallinity has a big influence on hardness, density, transparency, and diffusion.

In an embodiment, polypropylene is crystallizable. A degree of crystallinity could be about, 30%, 40% or 50%, 60%, 70%, 80%, 90%, 95% or more weight percent.

In the present specification, the term "crystalline propylene" refers to a polymer having a crystallinity less than about 80 weight percent.

the present specification, the term "highly crystalline" refers to a polymer having a crystallinity of about 80% weight percent or more.

The term "crystalline polyester" can refer to the polyester that has developed at least partial crystallinity during the orientation and heat-setting steps of the film-making process.

Without being bound by any theory, crystallinity can involve a regular repeating arrangement of the molecules. To produce a crystal, the polymer chains can be capable of packing closely together in a regular, parallel array. The formation of crystals can require polymer chain mobility. Once a certain degree of crystallinity is attained (which depends on the temperature at which crystallization is taking place) further mobility can be restricted such that a fraction of the polymer remains in a non-crystalline state ("amorphous").

The term "degree of crystallinity" can reflect the relative amount of crystalline regions and amorphous regions.

In an embodiment, "K value (viscosity)", is an empirical parameter closely related to intrinsic viscosity, often defined in slightly different ways in different industries to express viscosity-based estimate of statistical molecular mass of polymeric material used particularly for PVC. The most commonly used K value in Europe is the Fikentscher K value (referenced in DIN EN ISO 1628-1) obtained by dilute solution viscometry and solving Fikentscher equation.

Term, "hot melt glue" or "hot melt adhesive" refers to a type of a thermoplastic adhesive. Hot-melt glues usually consist of one base material with various additives. The composition is usually formulated to have a glass transition temperature (onset of brittleness) below the lowest service temperature and a suitably high melt temperature as well. The degree of crystallization should be as high as possible but within limits of allowed shrinkage. The melt viscosity and the crystallization rate (and corresponding open time) can be tailored for the application. Faster crystallization rate usually implies higher bond strength.

Some of the possible base materials of hot-melt adhesives include but not limited to Ethylene-vinyl acetate (EVA) copolymers, Ethylene-acrylate copolymers, Polyolefins (PO) (polyethylene (usually LDPE but also HDPE, which has a higher melting point and better temperature resistance), atactic polypropylene (PP or APP), polybutene-1, oxidized polyethylene, polyurethanes or similar.

In an embodiment, the practice of this invention involves using appropriate materials and processing steps to make a soft-feel coating and applying the coating to a polymeric core layer or base layer, or polymeric substrate to make a multilayer film with low gloss, soft-feel haptic properties, and excellent adhesion properties.

In an embodiment, the multilayer film includes a polymeric substrate film and a soft feel coating layer in contact with one side of the film.

In an embodiment, the polymeric substrate film preferably first is stretched in the machine direction. The soft-feel layer is cast onto a surface of the polymeric substrate film from a precursor soft-feel layer solution.

In an embodiment, the primary components of the soft-feel solution are an aliphatic polyurethane, an aqueous acrylic solution, wax dispersion, dulling or matting agents, PVP and a crosslinker.

In an embodiment, following the application of the solution to the substrate, the wet-coated substrate film is stretched in at least one direction from about 3 to 4.8 times (for BOPET base layer) or about 3 to 10 times (for BOPP base layer) its initial dimension while thermally treating the film. Such stretching preferably is in the transverse direction.

Thermal treatment normally includes heating the coated substrate to temperatures and for durations effective to accomplish several results either simultaneously or in rapid succession. These results are (a) removing solvent from the wet coating of the precursor soft-feel layer solution thereby providing a dry, integral and continuous solid soft-feel layer adhered to the surface of the polymeric substrate film, and (b) setting crystalline orientation created in the polymeric substrate film by stretching, and/or annealing the oriented polymeric substrate film to relieve internal stress generated during stretching, and (c) promoting interaction between the soft feel coating and the substrate to achieve excellent coating adhesion and wet rub properties.

In an embodiment, thermal shrinkage is minimized, and the resulting soft-feel coated polymeric substrate film is thermally stable.

Polymeric Substrate Film

In an embodiment, polymers suitable for use in this invention as the polymeric substrate or base film include polyesters and polyolefins, including but not limited to: polyethylene terephthalate (PET), polyethylene (PE), polypropylene (PP), nylon (PA), and polystyrene (PS).

A preferred polymer for this application is polyethylene terephthalate.

Core Layer

In an embodiment, the core layer (B) comprises one or more biaxially stretched film-forming crystallizable polymers, including polypropylenes and polyesters.

The polyesters include but are not limited to: polyethylene terephthalate (PET), polyethylene naphthalate, polybutylene terephthalate, polycyclohexyldimethylterephthalate (PCT), etc.

In an embodiment, polyester resins used in the base layer (B) can include, but are not limited to: homopolyesters or copolyesters of polyethylene terephthalate (PET), polyethylene naphthalate (PEN), polyethylene terephthalate-coisophthalate copolymer (IPET), polyethylene terephthalateco-naphthalate copolymer, polycyclohexylene terephthalate, polyethylene-co-cyclohexylene terephthalate, polyether-ester block copolymer, ethylene glycol or terephthalic acid based polyester homopolymers and copolymers, and combinations thereof.

In an embodiment, the polyester comprises poly (ethylene terephthalate) repeat units.

In an embodiment, the polyester in the base layer can comprise about 70-99.9 wt. %.

In an embodiment, the core layer (B) of the coextruded laminate film can also essentially comprise suitable polyolefins such as crystalline propylene homopolymers and/or high crystalline polypropylene homopolymers (HCPP). Examples of suitable homo-polypropylene resins include but are not limited to: Total Petrochemical grades 3271 and 3274, Phillipps 66® CH016, CH020-01. Examples of suitable high crystalline polypropylene resins (HCPP) include Phillips 66® CH020XK, Total Petrochemical 3270, Total Petrochemical 3273. Typically, these polypropylene resins have a melt flow rate in the range of from 1.5 to 4.0 g/10 min., a melting point in the range of from 160-167° C., and a density of about 0.90-0.92 g/cm3.

In an embodiment, the HCPP resins have xylene soluble less than 3%.

In an embodiment, HCPP is used as the core layer resin, preferably, a desirable amount of hydrogenated hydrocarbon resins can be optionally added into the core layer as a processing aid at an amount of from 1.0 to 25 wt % of the core layer with an additional upper and lower limit being 5 wt %, 10 wt %, 15 wt %, 20 wt %, preferably 2.5 to 10 wt % of the weight.

In an embodiment, examples of suitable hydrogenated hydrocarbon resins include Plastolyn® R1140 and Eastotac® E1-142W provided by Eastman Chemicals; Oppera® PR100A provided by ExxonMobil. Typically, these hydrocarbon resins are fully hydrogenated water-white amorphous materials having a softening point of from 130 to 150° C.; a glass transition temperature (Tg) in the range of from 75 to 90° C.; a weight-average molecular weight (Mw) in the range of from 500 to 1000 g/mole.

In an embodiment, the core layer resin, whether polyester or polypropylene, is typically 5 μm to 50 μm in thickness after biaxial orientation, preferably between 10 μm and 25 μm in thickness, and more preferably between 12 μm and 18 μm in thickness.

Skin Layer

In an embodiment, polypropylene-based core layer (B), the coextruded outer skin layer (A) which is designed for functionalities could be formulated from polyolefin resins well known in the prior art for the application of heat-sealing, winding, adhesion, or printing. The polyolefin resins include ethylene homopolymer, propylene homopolymer, copolymers and terpolymers of ethylene, propylene and/or butene-1 monomers, or blends thereof.

In an embodiment, modified polar polyolefin resins, for instance, maleic anhydride-grafted polar polyolefins or copolymerized polar polyolefin resins could be added into the outer layer A to promote adhesion, particularly as a tie-resin or tie-layer for receiving polar polymer coatings or coextruded layers (e.g., vinyl alcohol or ethylene vinyl alcohol polymers).

In an embodiment, the antiblock in the outer layer A is preferably selected from particles of synthetic silicates (e.g., Mizusawa Chemical Silton® JC30 grade), synthetic silica SiO2, fully cross-linked silicone polymers, and/or organic anti-blocking polymers such as poly(methyl methacrylate) (PMMA). Suitable examples of thermoplastic polymers for the outer functional or skin layer (A) include homopolymers of poly propylene and polyethylene resins such as Total Petrochemical 3571 and Dow DOWLEX® 2027G, respectively; minirandom (i.e. comprising a co-monomer other than propylene at less than 1.0 wt %) polypropylene polymer such as Total Petrochemical LX11203; propylene-ethylene copolymers such as Total Petrochemical 8473, ExxonMobil Vistamaxx®3588FL, and Basell Adsyl® 7416 XCP; copolymers and terpolymers of ethylene, propylene and butene such as Sumitomo WF345J8; and blends thereof.

Optional Skin Layer

Figure 2:
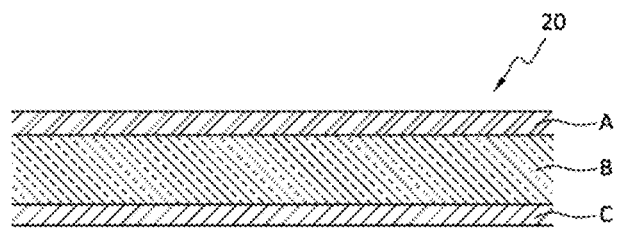
FIG. 2 is a schematic cross-sectional view of a film with a soft-feel coating applied on a polymeric base layer and a skin layer applied on the opposite side of the base layer.

In an embodiment, for polyester-based core layer, as shown in FIG. 2, in some embodiments, the film (20) may include an amorphous polyester skin layer (C). Skin layer (C) can comprise 60-90 wt. % of one or more of the following: isophthalate modified copolyesters, sebacic acid modified copolyesters, diethylene glycol modified copolyesters, triethylene glycol modified copolyesters, and/or cyclohexanedimethanol modified copolyesters.

In some embodiments, copolyesters in the amorphous polyester skin layer have a low melting or amorphous aromatic copolyester (such as one based on terephthalate/isophthalate copolymer with ethylene glycol or a copolyester made from a combination of terephthalic acid, ethylene glycol, and cyclohexyldimethanol). The amorphous copolyester may comprise isophthalate modified copolyesters, sebacic acid modified copolyesters, diethylene glycol modified copolyesters, triethyleneglycol modified copolyesters, cyclohexanedimethanol modified copolyesters, and combinations thereof.

In an embodiment, the amorphous polyester skin layer can comprise a copolymer with about 15-20 wt % isophthalate and about 80-85 wt % terephthalate polyester repeat units with ethylene glycol. The term "amorphous layer" refers to lack of crystallinity development during biaxial stretching, as a result of the co-polyesters present having very slow crystallization rate or being not capable of crystallization. The advantage of that feature is heat-sealed ability to a substrate at temperatures wherein the main or base layer stays intact.

In an embodiment, optionally, other skin layers may be positioned on the side of the main layer (B) opposite the side with the soft feel coating (A) for improving various performance aspects, such as gas barrier, appearance, hardness, print (ink) adhesion, film adhesion, haptic properties (i.e., with applied adhesives). As one example, a receiving layer suitable for metal deposition, ceramic deposition, in-line or off-line coatings comprising organic gas barrier layers, etc. may be applied as skin layer (C). Such skin layers are preferably coextruded with the main or core layer (B). When the skin layer (C) is present, the combination is referred to as a base layer.

Optional Adhesive Layer

Although not shown in FIGS. 1 and 2, in an embodiment, an adhesive layer optionally may be applied to the core layer (B). When the adhesive layer is present, the coating layer (A) is then coated onto the adhesive layer.

In an embodiment, the adhesive layer may include but is not limited to adhesive materials such as: polyurethanes, polyethyleneimines, acrylics and silanes. Such adhesive layers may be applied using in-line or off-line coating processes.

Soft Feel Layer Composition

As shown in FIGS. 1 and 2, in an embodiment, a soft-feel coating solution liquid is applied to one side of the core layer (B) with an in-line coater to create layer (A). The film 10 of FIG. 1 has only layers A and B, A/B, in this embodiment. Soft-feel carrier coating solutions suitable for applying to base layers include aliphatic water-borne polyurethanes (including Habbco Industries HABBCure® XPD-1484) and aqueous acrylic polymers (including Sigma SC1910R2).

In an embodiment, additional additives that further enhance the haptic properties include but are not limited to urea formaldehyde beads (including Huber Engineered Materials Pergopak® M3, or Pergopak® M6), aqueous wax dispersions (including Munzing Chemie GmbFl Luba-Print® 914A or Luba-Print® WP2120), Submicron silica dispersions (including Sylojet A30), Polyvinylpyrrolidone (including Kollidon 90F & Kolidon 30F). The soft-feel coating solution is blended, and a suitable crosslinker such as carbodiimide (including Carbodilite® V02L2), melamine (including Cymel 303LF), aziridine, or isocyanate is added within 48 hours of application to the film substrate.

Processes

Another important aspect of preferred embodiments of this invention is the segment of the process relating to forming the polymeric substrate film, applying the soft-feel layer solution to a surface of the film, and post-application treating the coated film.

Post-application treatment includes removing volatile liquid of solution, and optional crosslinking of the polyurethane and acrylic to form a composite of solid soft-feel layer contiguously adhered to the substrate, with stretching and optionally with heat-setting the composite.

Polymeric substrate film formation is accomplished using well known conventional continuous film extrusion unit operation technology. Raw material polymer resin is typically supplied in pellet form. It may be dried to low moisture levels before being heated to melt for extrusion. Equipment used in these operations include well known polymer melt processing extruders with film-forming dies that extrude a molten film onto quenching chill rolls that solidify the film.

The film then passes through a sequential series of rolls running at different speeds to stretch the film in a longitudinal, so-called machine direction (MD). The film may be heated in connection with machine direction stretching to obtain preselected morphological effects in the polymer.

In one embodiment of this invention, coating of the polymeric substrate film occurs by an "off-line" method in which film formation is completed and the soft-feel layer precursor solution is applied to the fully formed film. To complete substrate film formation of a uniaxially stretched film, i.e., stretched only in a first technical direction such as the machine direction of a continuously operating film forming unit operation, the film can continue to pass through ovens and tenters to stretch and heat-treat the film in a second technical direction transverse to the machine direction.

In an embodiment, it is also preferable to ion discharge-treat the coating receiving side of the film prior to coating to ensure adequate wet-out of the coating onto the substrate.

In off-line coating, conventional film coating technology can be used to apply the soft-feel layer solution to a surface of the completed film which may be unoriented, uniaxially oriented or biaxially oriented.

A composite soft-feel-coated multilayer film according to this invention has a biaxially oriented polymeric substrate which can exhibit low gloss and haptic properties.

In an embodiment, typical solution coating methods that may be used include dip, spray, paint, doctor and meyer rod type techniques, for example. Preferably a reverse gravure application of the coating can be used.

The soft-feel coating is dried in a static oven at drying temperatures such that the soft-feel coating is fully dried and crosslinked, and the substrate film experiences minimal thermal shrinkage. A preferred embodiment of the invention calls for "in-line coating" in which the soft-feel layer is added to the polymeric substrate film by depositing a liquid soft-feel layer solution between the two continuous sequential steps of machine direction (MD) and transverse direction (TD) orientation. That is, the polymeric substrate onto which the wet soft-feel layer solution is applied preferably is stretched in a first technical direction, normally the machine direction, prior to solution application.

For example, the polymeric substrate may be stretched in the machine direction from about 300% to about 600% (i.e., from 3 times to 6 times the original dimension) for BOPP, or from about 300% to about 400% (i.e., from 3 times to 4 times the original dimension) for BOPET. Following application of the soft-feel coating solution, the coated polymeric substrate is stretched in a second technical direction transverse to the first technical direction.

For in-line soft-feel layer application, reverse gravure roll techniques are preferred for placing a wet coating of soft-feel layer solution onto the polymer substrate film. The wet coating is preferably substantially dried to form a unitary soft-feel layer adhered contiguously to the substrate surface in preheating oven zones prior to transverse direction stretching.

Additionally, the soft-feel layer is crosslinked during oven heating by reaction with a crosslinking agent added to the soft-feel layer solution. After transverse stretching, the film can be heat-set to minimize shrinkage.

The soft-feel layer has been found to successfully extend transversely to about 3-4.5 times its original dimension (i.e., 3×-4.5× or 300% to 450%) when applied to BOPET base films, which is a property that is suitable for lower extension substrate materials such as polyesters.

In another embodiment, a polypropylene-based substrate can be used instead of a polyester substrate for receiving the soft-feel coating. In such a case, higher transverse orientation rates can be successfully employed. The soft-feel layer may extend transversely to about 3-10 times its original dimension (i.e., 3×-10× or 300% to 1000%) when applied to BOPP base films, and still maintain the desirable soft-feel haptic qualities and all its other attributes.

Figure 3:
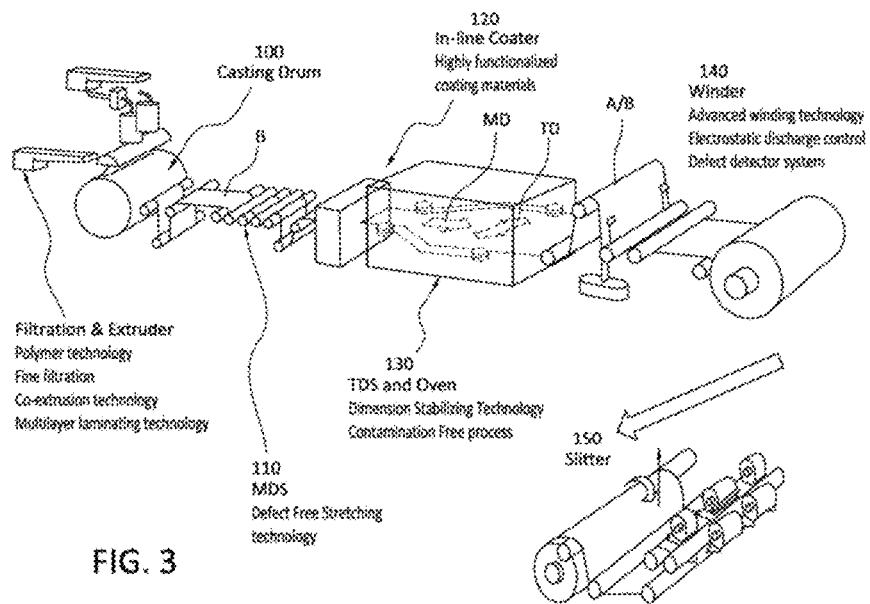
FIG. 3 is a schematic diagram of equipment for an in-line film-making process.
Figure 4:
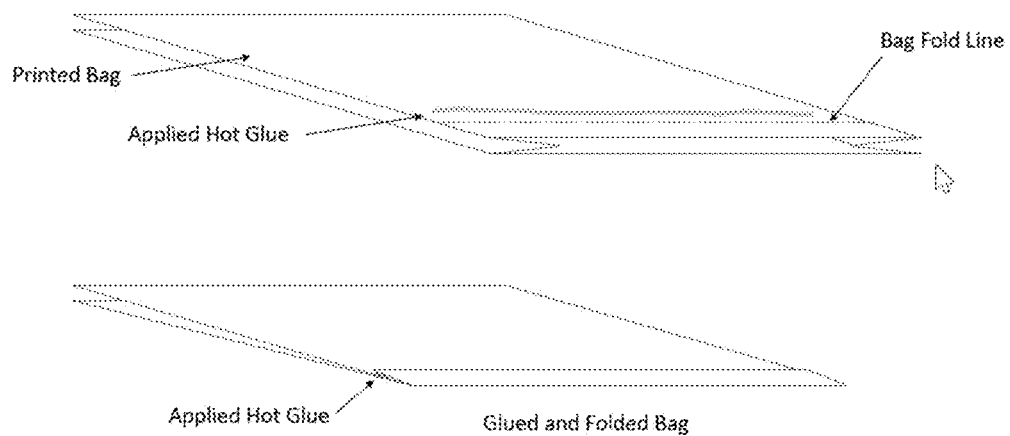
FIG. 4 is an example of a Pinch Bottom Fold Bag with hot melt glue.

Film making equipment suitable for use for "in-line coating" is schematically shown in FIG. 3. The polymeric substrate film or core layer (B) is cast onto a casting drum 100 and stretched in the machine direction (MD) in a series of rollers identified as molecular dynamics simulation MDS, or defect free stretching.

The soft-feel coating is applied to the surface of the core layer (B) in the in-line coater 120. The coated film then enters the transverse direction stretcher (TDS) and oven 130 where the coated film is stretched in the transverse direction (TD), preferably while it is heated. From here, the heat-treated coated film exits the TDS and oven 130 and is wound on a winder 140 and then cut to desired widths at a slitter 150. Term 'TDS' is synonymous with "TDO" (transverse direction oven" or "transverse direction orienter"

Test Methods for Examples

This invention is now illustrated by examples of certain representative embodiments.

Analytical methods used in the examples are as follows:

(1) Coat weight (Primer thickness)—Gravimetric method: Film samples are cut in 4×4 inch sheets and weighed on a Mettler™ analytical balance. The coating is washed off with a solvent, such as isopropyl alcohol, dried, and re-weighed on the balance. The difference in weight times the conversion factor 97 is required to convert $cm^3$ to microns per gram. The weight in gram per square meter (gsm), and then is converted to, and recorded, in units, such as pound (lb.) per ream.

(2) Surface Gloss: Gloss is associated with the capacity of a surface to reflect more light in directions close to the specular than in others. Surface gloss was measured on the soft-feel coated side of the film at 60° angle according to ASTM D523 using a Micro TRI-Gloss™ Meter from BYK-Gardner. Three individual measurements along the machine direction of film formation (MD) and three along the transverse direction (TD) were conducted. The overall average of all six measurements is reported in Table 3. The results are expressed in Gloss Units (GU). The measurement results of a gloss meter are related to the amount of reflected light from a black glass standard of defined refractive index that defines a standard gloss measurement value of 100 GU. Material to be measured with a higher refractive index than the standard, such as polymeric film, can have a measurement value above 100 GU. Typically, metallic surfaces measure values above 700 GU at 60° angle and above about 1500 GU at 20° angle. For this Soft Matte coated films the desired gloss value is equal to or below a gloss measurement 12 GU. In an embodiment, gloss value of the film is less than 10 GU, less than 9 GU, less than 8 GU, less than 7 GU, less than 5 GU or lesser.

ASTM D523: Measurements by this test method correlate with visual observations of surface shininess made at roughly the corresponding angles. Measured gloss ratings by this test method are obtained by comparing the specular reflectance from the specimen to that from a black glass standard. When specimens differing widely in perceived gloss or color, or both, are compared, nonlinearity may be encountered in the relationship between visual gloss difference ratings and instrumental gloss reading differences. The apparatus shall consist of a light source furnishing an incident beam, means for locating the surface of the specimen, and a receptor located to receive the required pyramid of rays reflected by the specimen. The receptor shall be a photosensitive device responding to visible radiation. The axis of the incident beam shall be at one of the specified angles from the perpendicular to the specimen surface. The axis of the receptor shall be at the mirror reflection of the axis of the incident beam. The axis of the incident beam and the axis of the receptor shall be within 0.10 of the nominal value indicated by the geometry. With a flat piece of polished black glass or other front-surface mirror in the specimen position, an image of the source shall be formed at the center of the receptor field stop (receptor window). The length of the illuminated area of the specimen shall be not more than one third of the distance from the center of this area to the receptor field stop.

Primary Standards-Highly polished, plane, black glass with a refractive index of 1.567 for the sodium D line shall be assigned a specular gloss value of 100 for each geometry. The gloss value for glass of any other refractive index can be computed from the Fresnel equation (5). For small differences in refractive index, however, the gloss value is a linear function of index, but the rate of change of gloss with index is different for each geometry. Each 0.001 increment in refractive index produces a change of 0.27, 0.16, and 0.016 in the gloss value assigned to a polished standard for the 20, 60, and 85° geometries, respectively. For example, glass of index 1.527 would be assigned values of 89.2, 93.6, and 99.4, in order of increasing geometry.

Position each specimen in turn beneath (or on) the glossmeter. For specimens with brush marks or similar texture effects, place them in such a way that the directions of the marks are parallel to the plane of the axes of the incident and reflected beams. Take at least three readings on a 3 by 6-in. (75 by 150-mm) area of the test specimen. If the range is greater than two gloss units, take additional readings and calculate the mean.

(3) Haze: Haze of the film was measured using a BYK Gardner Hazegard Plus™ Hazemeter according to ASTM D1003. ASTM D1003 defines haze as the percentage of transmitted light which, in passing through the specimen, deviates from the incident beam by more than 2.5 degrees on the average. A film with a percent haze value of about 90 or below is preferred.

In an embodiment, the film has percent haze value less than 80, less than 70, less than 60, less than 50 or lesser.

In an embodiment, the percent haze value is less than 90 but more than 70; less than 90 but more than or equal to 75, less than 90 but more than or equal to 80, less than 90 but more than or equal to 85.

(4) Coefficient of Friction: The coefficient of friction (symbol: $\mu$) can be either the coefficient of static friction or the coefficient of dynamic friction, based on the formula $Ff=pFn$, where the coefficient of static friction, ps, is the friction force between two objects when neither of the objects is moving. The coefficient of dynamic friction is the force between two objects when one object is moving, or if two objects are moving against each other. The values of the coefficient of static (ps) and dynamic friction (pd) were measured using a calibrated friction meter Monitor/Slip & Friction Model No. 32-06 made by Testing Machines Inc. (TMI) substantially in conformance to ASTM D1894. The friction testing was conducted in the "ND/ND" "Coated to Coated side" mode, i.e., between the "(non)-drum side" of one film sheet and the "non-drum side" of a second sheet of film. The "non-drum side" (ND) is the coated side of the film opposite the "drum side" (D) where drum refers to the extrusion casting drum (cooling drum or casting drum). The "drum side" is the uncoated side of the film. The coefficient of static (ps) and dynamic friction (pd), COF, was essentially measured between the coated side of the film against another sheet of coated film. The preferred range for "ND/ND" COF in the embodiments is 0.3-1.0. In an embodiment.

(5) Glue Testing/Hot Melt Adhesion: Hot Melt Adhesion strength to the soft-touch matte coating surface is determined in the following qualitative method. The hot melt glue is applied to the coated matte side of the film samples, using an Infinity Bond™ "easy melt" benchtop pneumatic hot melt tank. A pre-weighed 1/16 inch wide, 0.25 g melt bead of 370° F. hot melt adhesive is first applied onto the coated matte surface of a pre-weighed one gram, One inch*3-inch linear strip of soft-touch matte film, then applied to another one gram, One inch*3-inch linear strip of soft-touch matte film (matte to matte). The adhered strips are then placed into a Sentinel™ model SL-10 heat sealer at ambient conditions for 0.5 seconds at 40 pounds per square inch, psi. Once the samples are aged for 5 minutes at room temperature, they are then pulled on a tensiometer. The Tensilon™ machine jaws are set to 2 inches apart, and the test is conducted at an extension rate of 20 inches/minute. Samples are pulled to the point of adhesive failure. Each strip is weighed, and the percent of glue adhered to each side is determined. A cohesive failure consisting of a 50/50% split of hot melt glue remaining on both sides is the goal. The samples are rated 1-4 (1=good to 4=bad) wherein:

1=cohesive split (50%:50%)+3%
2=51-60% on one side: 49-40% on the other side;
3=61-80%: 39-20%; and
4=81-100%: 11-0% (adhesive split).

(6) Soft feel: A set of physical parameters in this application was established as described in above paragraphs.

(7) Contact angle measurements on films for surface tension measurements were conducted on a Tantec™ contact angle meter CAM-PLUS™. Fill the syringe with deionized water. First rotate the micrometer housing counter-clockwise until the shaft is all the way out. Remove the syringe from the unit and immerse the needle tip in de-ionized water and depress plunger. Allow spring to retract plunger and insert needle back into the holder. Screw the housing back on and remove air by turning micrometer clockwise.

Cut a sample no wider than 40 mm and at least 3 inches long. Load film sample.

Move the sample stage to the left for loading and pull rollers outward and down to lock in open position. Then place the long end of the film sample between the back roller and the sample stage. Place the other end between the front roller and the stage. Release (close) both rollers and take up the slack by rotating the front knob clockwise.

Testing Film Sample

Slowly turn the light beam switch clockwise to about % power and ensure the bottom of the needle is at the top of the grid and in focus. Move the sample stage to the right and below the needle. Turn the Tantec™ contact angle meter CAM-PLUS™ micrometer clockwise until a droplet appears around the size of ten squares on the grid. Then raise the stage until the droplet touches the surface. Lower the stage to allow the transfer of the droplet. Ensure droplet is round on the film. Align left bottom edge of the droplet to the crosshairs and bring into focus. Determine the coordinates of the droplets apex by dividing the width of the base of the droplet image by two. Rotate the clear protractor until the hairline on it crosses the apex. The contact angle is inserted into a binomial approximation equation to convert it to surface energy in dynes.

EXAMPLES

Two-layer BOPET coextruded carrier films having a B/C layer structure (PET-02) and single-layer BOPET films having a B layer structure (PET-01), for the examples, were prepared by the following method. PET for each of layers B and/or C, were blended, dried and then extruded in conventional melt extrusion equipment.

To produce core layer B a serial set of single screw extruders was used. Extrusion temperatures were in the range of 270° C. to 300° C. The polymer melt flows from each extruder were filtered separately. The polymer melt flow for layer C was coextruded onto one side of the polymer melt flow forming layer B to form an overall B/C base layer structure. The core layer B or the laminate structure of B/C (PET-02) entered a flat die set at about 270° C. The melt curtain exiting the die was cast onto a casting roll and was electrostatically pinned onto a rotating casting roll chilled to about 20° C. causing the curtain to solidify into a continuously moving amorphous sheet. This sheet entered a set of rotating heated rolls of different speeds such that the traveling sheet was oriented about 4 times in the machine direction.

Base Film Layer Components

Film-grade crystalline polyethylene terephthalate (PET) resin: F21MP (IV=0.65; Tm=255° C.) manufactured by Toray Plastics (America), Inc. This resin grade was used for layer B. PET resin anti-block masterbatch F18M, containing 2 wt. % silica particles of average size 2 μm (Fuji Silysia 310P) dispersed in a PET resin matrix, manufactured by Toray Plastics (America), Inc. (IV=0.62; Tm=255° C.). This masterbatch was used as needed in either or both layers B and C.

Slow-crystallizing co-polyester resin "IPET", F55MResin (iv=0.69; Tm=205° C.) manufactured by Toray Plastics (America), Inc. based on 19:81 molar (=weight % in this case) parts combination of isophthalic/terephthalic acid reacted with ethylene glycol. This resin grade was used for layer C.

Soft Matte Coating Formulation

The soft matte coating formulation is shown in Table 1.

TABLE 1

| Base component formulation | |
| --- | --- |
| Component | Wt % |
| Polyurethane/acrylic dispersion | 10-40 |
| Surfactants | 0.1-0.6 |
| Organic filler | 1-4 |
| Wax | 0.5-3.5 |

In addition, up to 70% by weight water and/or non-reactive solvent(s) may be present in various embodiments of the invention, such amount being calculated based on the total weight of all "solids" in the coating composition.

In certain embodiments of the above-mentioned exemplary formulations, the base formulation is further blended consisting essentially of or consisting of at least one additions of an acid catalyst, melamine or carbodiimide.

Also, of the above-mentioned exemplary formulations, the base formulation can be further blended with silicone based defoamers and/or Polyvinyl pyrrolidone.

Preparation of In-Line Soft Touch Matte Coated Film

Figure 5:
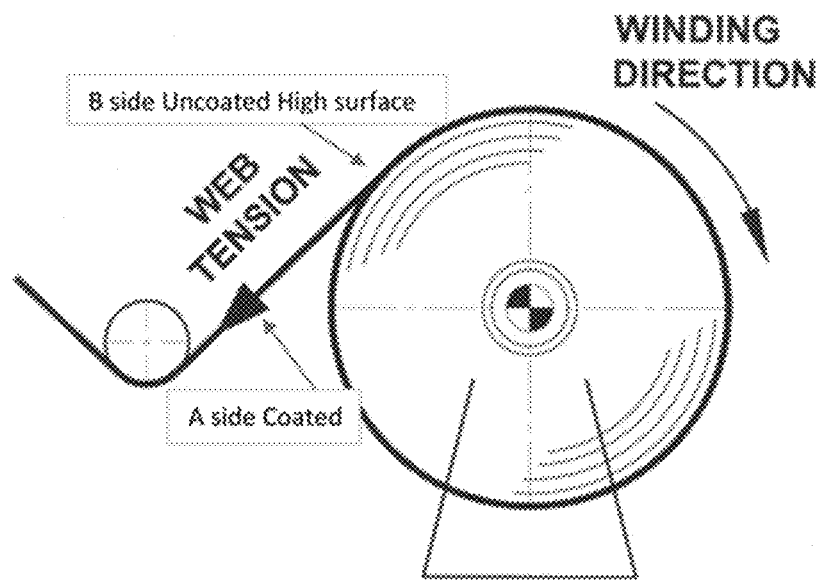
FIG. 5 shows that backside transfer occurs when the coated aside is in contact with the uncoated B side when film is rolled after coating.

Next, a liquid solution of the soft-feel coating formulations set out in Table 1 was mixed together and applied as layer A onto one side of layer B of the machine direction (MD)-oriented substrate sheet using an in-line coater before the sheet was introduced to the transverse tenter oven for transverse direction (TD) orientation. If coextruded layer C is used, the side of layer B opposite the side with layer C was coated with layer A before the sheet was introduced to the tenter oven. The machine-direction oriented sheet with soft-feel coating liquid solution applied thereon then traveled into an enclosed heated oven (tenter oven), where the film was first preheated to a temperature of about 80° C. to 90° C. In the next zone, at about 80° C. to 121° C., the moving film was oriented about 4-4.5 times in the transverse direction, and then heat set at about 195° C. to 215° C. The film then was relaxed by about 3% in the relaxation zone of the oven. The resulting two-layer A/B and three-layer A/B/C films were wound up into rolls as is standard industry practice. Optionally, after MD orientation but prior to application of the soft-touch coating solution, the surface of layer B that receives the soft-touch coating may be optionally discharge-treated to enhance wettability ("wet out") and adhesion of the soft-touch coating. This discharge-treatment, the activation of surface prior to coating, may be conducted by any means well known to the art such as, but not limited to, corona discharge, flame, or atmospheric plasma treatment methods. The coated film is then wound into rolls. When in roll form, the A side is then in contact with the B side. At which time, if the A side coating contains any migratory additives, such as, but not limited to Silicone. It can transfer from the coated side onto the uncoated B side. When this occurs, the B side surface energy is reduced. This is referred to as backside transfer as shown in FIG. 5.

The desirable range for the B side treatment of polyester films is 45-50 dynes.

Example 1-4

Illustrated a silicone free coating containing Sylojet 30 and/or Kolidon to reduce gloss & improve hot melt adhesion.

These versions meet all the necessary specifications without effecting the B side surface energy.

Comparative Example 5

Illustrates a silicone free coating without Sylojet A30 & Kolidon 90F. This version does not meet the gloss or the glue adhesion specifications. It does maintain the B side surface energy.

Comparative Examples 6, 7, 8

These samples contain silicone & the backside transfer is evident in the decrease of surface energy over time. They also do not meet the requirements for Gloss & Hot melt Adhesion. A back side transfer is that in the case of coatings that contain Silicone, the silicone can migrate to the surface of the coating & also transfer to the back side of the film when in roll form. The backside transfer of the silicone (or any other migratory additives) that lowers the surface energy of the uncoated (B side).

Result: See, Table 3 for results.

Example 1-4: Illustrate a silicone free coating containing Sylot jet 30 & Kolidone to reduce gloss & improve hot melt adhesion. These versions meet all the necessary specifications without effecting the B side surface energy.

Comparative Example 5: Illustrates a silicone free coating without Sylojet A30 & Kolidone 90° F. This version does not meet the gloss or the glue adhesion specifications. This is silicone free and does meet the necessary specifications for maintaining the B Side treatment.

Comparative Examples 6, 7, 8: These samples contain silicone, & the backside transfer is evident in the decrease of surface energy over time. These variations also do not meet the specification for Gloss or Hot melt glue adhesion.

All references, including granted patents and patent application publications, referred herein are incorporated herein by reference in their entirety.

TABLE 2 provides formulations for Examples and Comparative Examples.

| Clear Barrier Formulations | Example 1 | | | | Example 2 | | | | Example 3 | | | |
|---|---|---|---|---|---|---|---|---|---|---|---|---|
| | pph | solids fraction | dry wieght | dry wt % | pph | solids fraction | dry wieght | dry wt % | pph | solids fraction | dry wieght | dry wt % |
| Film Type | PET | | | | PET | | | | PET | | | |
| Film Gauge | 48 | | | | 48 | | | | 48 | | | |
| Primer thickness (gsm) | | | | 1.20 | | | | 1.20 | | | | 1.20 |
| Sigma SC1910R2 (PUD) | 12.8 | 0.30 | 3.83 | 23.25 | 12.16 | 0.30 | 3.65 | 22.53 | 12.43 | 0.30 | 3.83 | 22.53 |
| Habbcure 1484 (low VOC PUD & Acrylic) | 18.2 | 0.39 | 7.11 | 43.20 | 17.38 | 0.39 | 6.78 | 41.87 | 18.08 | 0.39 | 7.05 | 25.36 |
| Cork 1031 (PUD & Silicone) | 0.00 | 0.00 | 0.00 | 0.00 | 0.00 | 0.00 | 0.00 | 0.00 | 0.00 | 0.00 | 0.00 | 0.00 |
| XPD 1383 (PUD & acrylic) | 0.00 | 0.00 | 0.00 | 0.00 | 0.00 | 0.00 | 0.00 | 0.00 | 0.00 | 0.00 | 0.00 | 0.00 |
| water | 60.39 | 0.00 | 0.00 | 0.00 | 57.54 | 0.00 | 0.00 | 0.00 | 58.84 | 0.00 | 0.00 | 83.97 |
| S440 (surfactant) | 0.15 | 0.98 | 0.15 | 0.89 | 0.14 | 0.98 | 0.14 | 0.87 | 0.15 | 0.98 | 0.15 | 0.21 |
| S420 (Surfactant) | 0.21 | 0.98 | 0.21 | 1.25 | 0.20 | 0.98 | 0.20 | 1.21 | 0.21 | 0.98 | 0.21 | 1.21 |
| PPK M6 (Urea Formaldyhyde beads) | 0.49 | 1.00 | 0.49 | 2.98 | 0.47 | 1.00 | 0.47 | 2.88 | 0.48 | 1.00 | 0.49 | 2.88 |
| LP914A-disp (wax dispersion) | 1.63 | 0.40 | 0.65 | 3.96 | 1.55 | 0.40 | 0.62 | 3.84 | 1.59 | 0.40 | 0.65 | 3.84 |
| Dow52 (silicone dispersion) | 0.00 | 0.00 | 0.00 | 0.00 | 0.00 | 0.00 | 0.00 | 0.00 | 0.00 | 0.00 | 0.00 | 0.00 |
| Kingcure 5925 (Acid catalyst) | 0.14 | 0.25 | 0.04 | 0.21 | 0.13 | 0.25 | 0.03 | 0.21 | 0.14 | 0.25 | 0.04 | 0.21 |
| Cymel 303LF (melamine crosslinker) | 1.65 | 0.98 | 1.62 | 9.82 | 1.57 | 0.98 | 1.54 | 9.52 | 1.61 | 0.98 | 1.62 | 9.52 |
| Butyl Cellosolve (solvent) | 0.22 | 0.00 | 0.00 | 0.00 | 0.21 | 0.00 | 0.00 | 0.00 | 0.22 | 0.00 | 0.00 | 0.31 |
| Sylojet A30 (silica solution) | 2.49 | 0.30 | 0.75 | 4.54 | 7.21 | 0.30 | 2.16 | 5.30 | 4.87 | 0.30 | 0.90 | 5.30 |
| Kollidon 30 (Polyvinyl Pyrolidone) | 0.00 | 0.00 | 0.00 | 0.00 | 0.00 | 0.00 | 0.00 | 0.00 | 0.00 | 0.00 | 0.00 | 0.00 |
| Kollidon 90F (Polyvinyl Pyrolidone) | 1.63 | 1.00 | 1.63 | 9.90 | 1.44 | 1.00 | 1.44 | 11.77 | 1.71 | 1.00 | 2.00 | 11.77 |
| | 100 | | 16.47 | 100.00 | 100.00 | | 17.03 | 100.00 | 100.00 | | 16.99 | 100.00 |

| Clear Barrier Formulations | Example 4 | | | | Comparative Example 5 | | | | Comparative Example 6 | | | |
|---|---|---|---|---|---|---|---|---|---|---|---|---|
| | pph | solids fraction | dry wieght | dry wt % | pph | solids fraction | dry wieght | dry wt % | pph | solids fraction | dry wieght | dry wt % |
| Film Type | PET | | | | PET | | | | PET | | | |
| Film Gauge | 48 | | | | 48 | | | | 48 | | | |
| Primer thickness (gsm) | | | | 1.2 | | | | 1.20 | | | | 1.20 |
| Sigma SC1910R2 (PUD) | 12.62 | 0.30 | 3.79 | 17.74 | 13.31 | 0.30 | 3.99 | 27.35 | 0 | 0.3 | 0.00 | 0.00 |
| Habbcure 1484 (low VOC PUD & Acrylic) | 19.02 | 0.39 | 7.42 | 50.82 | 19.02 | 0.39 | 7.42 | 50.82 | 0 | 0.39 | 0.00 | 0.00 |

TABLE 2-continued provides formulations for Examples and Comparative Examples.

| Component | | | | | | | | | | | | |
|---|---|---|---|---|---|---|---|---|---|---|---|---|
| Cork 1031 (PUD & Silicone) | 0.00 | 0.00 | 0.00 | 0.00 | 0.00 | 0.00 | 0.00 | 0.00 | 34.60 | 0.27 | 9.34 | 30.57 |
| XPD 1383 (PUD & acrylic) | 0.00 | 0.00 | 0.00 | 0.00 | 0.00 | 0.00 | 0.00 | 0.00 | 46.70 | 0.35 | 16.35 | 53.48 |
| water | 62.98 | 0.00 | 0.00 | 0.00 | 62.98 | 0.00 | 0.00 | 0.00 | 11.06 | 0.00 | 0.00 | 0.00 |
| S440 (surfactant) | 0.16 | 0.98 | 0.15 | 1.05 | 0.16 | 0.98 | 0.15 | 1.05 | 0.16 | 0.98 | 0.16 | 0.51 |
| S420 ( Surfactant | 0.21 | 0.98 | 0.20 | 0.29 | 0.22 | 0.98 | 0.21 | 1.47 | 0.16 | 0.98 | 0.16 | 0.51 |
| PPK M6 (Urea Formaldyhyde beads) | 0.49 | 1.00 | 0.49 | 0.68 | 0.51 | 1.00 | 0.51 | 3.50 | 1.04 | 1.00 | 1.04 | 3.40 |
| LP914A-disp( wax dispersion) | 1.62 | 0.40 | 0.65 | 2.27 | 1.70 | 0.40 | 0.68 | 4.66 | 4.07 | 0.40 | 1.63 | 5.33 |
| Dow52 ( silicone dispersion) | 0.00 | 0.00 | 0.00 | 0.00 | 0.00 | 0.00 | 0.00 | 0.10 | 0.00 | 0.00 | 0.00 | 0.00 |
| Kingcure 5925( Acid catalyst) | 0.14 | 0.25 | 0.03 | 0.19 | 0.15 | 0.25 | 0.04 | 0.25 | 0.04 | 0.25 | 0.01 | 0.03 |
| Cymel 303LF (melamine crosslinker) | 1.64 | 0.98 | 1.60 | 2.29 | 1.72 | 0.98 | 1.69 | 11.55 | 1.92 | 0.98 | 1.88 | 6.16 |
| Butyl Cellosolve ( solvent) | 0.23 | 0.00 | 0.00 | 0.00 | 0.23 | 0.00 | 0.00 | 0.00 | 0.15 | 0.00 | 0.00 | 0.00 |
| Sylojet A30 ( silica solution) | 5.00 | 0.30 | 0.89 | 7.01 | 0.00 | 0.30 | 0.00 | 0.00 | 0.00 | 0.30 | 0.00 | 0.00 |
| Kollidon 30 (Polyvinyl Pyrolidone) | 1.98 | 0.00 | 0.00 | 2.78 | 0.00 | 0.00 | 0.00 | 0.00 | 0.00 | 0.00 | 0.00 | 0.00 |
| Kollidon 90F (Polyvinyl Pyrolidone) | 0.00 | 1.00 | 1.98 | 0.00 | 0.00 | 1.00 | 0.00 | 0.00 | 0.00 | 1.00 | 0.00 | 0.00 |
| | 100.00 | | 14.60 | 100.00 | 100.00 | | 14.60 | 100 | 100.00 | | 30.56 | 100.00 |

| Clear Barrier Formulations | Comparative Example 7 | | | | Comparative Example 8 | | | |
|---|---|---|---|---|---|---|---|---|
| | pph | solids fraction | dry wieght | dry wt % | pph | solids fraction | dry wieght | dry wt % |
| Film Type | PET | | | | PET | | | |
| Film Gauge | 48 | | | | 48 | | | |
| Primer thickness (gsm) | | | | 1.20 | | | | 1.20 |
| Sigma SC1910R2 (PUD) | 0.00 | 0.3 | 0.00 | 0.00 | 0 | 0.3 | 0.00 | 0.00 |
| Habbcure 1484 (low VOC PUD & Acrylic) | 0.00 | 0.39 | 0.00 | 0.00 | 0 | 0.39 | 0.00 | 0.00 |
| Cork 1031 (PUD & Silicone) | 34.62 | 0.27 | 9.35 | 30.57 | 34.55 | 0.27 | 9.33 | 30.57 |
| XPD 1383 (PUD & acrylic) | 46.72 | 0.35 | 16.35 | 53.48 | 46.63 | 0.35 | 16.32 | 53.48 |
| water | 11.07 | 0.00 | 0.00 | 0.00 | 11.04 | 0.00 | 0.00 | 0.00 |
| S440 (surfactant) | 0.16 | 0.98 | 0.16 | 0.51 | 0.16 | 0.98 | 0.16 | 0.51 |
| S420 ( Surfactant | 0.16 | 0.98 | 0.16 | 0.51 | 0.16 | 0.98 | 0.16 | 0.51 |
| PPK M6 (Urea Formaldyhyde beads) | 1.04 | 1.00 | 1.04 | 3.40 | 1.04 | 1.00 | 1.04 | 3.40 |
| LP914A-disp( wax dispersion) | 4.07 | 0.40 | 1.63 | 5.33 | 4.06 | 0.0 | 1.63 | 5.33 |
| Dow52 ( silicone dispersion) | 0.05 | 0.00 | 0.00 | 0.00 | 0.25 | 0.00 | 0.00 | 0.00 |
| Kingcure 5925( Acid catalyst) | 0.04 | 0.25 | 0.01 | 0.03 | 0.04 | 0.25 | 0.01 | 0.03 |
| Cymel 303LF (melamine crosslinker) | 1.92 | 0.98 | 1.88 | 6.16 | 1.92 | 0.98 | 1.88 | 6.16 |
| Butyl Cellosolve ( solvent) | 0.15 | 0.00 | 0.00 | 0.00 | 0.15 | 0.00 | 0.00 | 0.00 |
| Sylojet A30 ( silica solution) | 0.00 | 0.30 | 0.00 | 0.00 | 0.00 | 0.30 | 0.00 | 0.00 |
| Kollidon 30 (Polyvinyl Pyrolidone) | 0.00 | 0.00 | 0.00 | 0.00 | 0.00 | 0.00 | 0.00 | 0.00 |

TABLE 2-continued provides formulations for Examples and Comparative Examples.

| Kollidon 90F (Polyvinyl Pyrolidone) | 0.00 | 1.00 | 0.00 | 0.00 | 0.00 | 1.00 | 0.00 | 0.00 |
|---|---|---|---|---|---|---|---|---|
| | 100.00 | | 30.58 | 100.00 | 100.00 | | 30.51 | 100.00 |

TABLE 3 provides a comparative study of examples 1-4 and comparative examples 5-8.

| Test Specification | Gloss 60° gloss units 3-12 | COF Static .5-1.5 | COF Dynamic | Haze % 60-90 | *The change in Surface Energy of uncoated B Side film on Day 1 & 7 after production Delta = \| D7-D2\| = ≤5 | Glue adhesion testing, 5 sample average Rated 1-4 (good to bad) |
|---|---|---|---|---|---|---|
| Example 1 | 9.1 | 0.928 | 0.882 | 86 | \|47-50\| = 3 | 1 |
| Example 2 | 7.6 | 0.666 | 0.538 | 76 | \|46-50\| = 4 | 1 |
| Example 3 | 8.6 | 0.754 | 0.687 | 76 | \|45-50\| = 5 | 1 |
| Example 4 | 9.2 | 0.790 | 0.72 | 85 | \|43-48\| = 5 | 1 |
| Comparative Example 5 | 12.2 | 1.002 | 0.973 | 82 | \|46-48\| = 6 | 2 |
| Comparative Example 6 | 16 | 0.725 | 0.634 | 68 | \|33-44\| = 11 | 3 |
| Comparative Example 7 | 13 | 0.835 | 0.784 | 67 | \|36-44\| = 8 | 4 |
| Comparative Example 8 | 12 | 0.555 | 0.434 | 61 | \|29-44\| = 15 | 4 |

*After producing the coated film it is wound into a roll & a piece is taken off on Day 1 = D1 and Day 7 = D7. The results is the change in surface energy over 7 days Side A to Side B

What is claimed is:

1. A film comprising:
a layer comprising a core layer comprising a biaxially stretched layer comprising a polyester and a top layer on the core layer, wherein the top layer comprises urethane particles, polyvinyl pyrrolidone (PVP), and a crosslinker;
wherein a surface gloss of the film measured on the top layer at 60° according to ASTM D523 is equal to 4-12; and
wherein the film further comprises a coating of a hot melt adhesive, wherein the hot melt adhesive has a cohesive split of 50/50% within the film when approximately 1 gm of the film is coated with approximately 1/16 inch wide, approximately 0.25 g melt beads of the hot melt adhesive at 370° F.

2. The film of claim 1, wherein the PVP having Fikentscher K value in a range from 17 to 90.

3. The film of claim 1, wherein a difference in a surface energy of the film and the core layer is equal to or less than 5%.

4. The film of claim 1, wherein the film has a coefficient of static (μs) and a dynamic friction (μd) in a range of approximately 0.3-1.0.

5. The film of claim 1, wherein the top layer further comprises silica.

6. The film of claim 1, wherein the top layer is free of silicone.

7. The film of claim 1, wherein the film further comprises a skin layer, wherein the top layer, the core layer and the skin layer are in this order.

8. The film of claim 1, wherein the film has a haze percentage less than 90 and more than 75.

9. The film of claim 7, wherein a first composition of the skin layer and a second composition of the core layer are different.

10. The film of claim 1, wherein the core layer further comprises an adhesive layer.

11. The film of claim 1, wherein the surface gloss is less than 10.

12. The film of claim 1, wherein the urethane particles have an average aspect ratio equal to or greater than 1.5.

13. The film of claim 1, wherein the core layer further comprises crystalline propylene homopolymers and/or high crystalline polypropylene homopolymers (HCPP).

14. The film of claim 1, wherein the urethane particles comprise an aliphatic water-borne polyurethane.

15. A method comprising:
stretching a polyester-containing core layer longitudinally to form a first stretched layer; applying a coating mixture comprising urethane particles, polyvinyl pyrrolidone (PVP) and a crosslinker to the first stretched layer to form a first coated layer; heating the first coated layer; stretching the first coated layer transversally to form a second coated layer; wherein a top surface of the second coated layer has a surface gloss at 60° according to ASTM D523 equal to 4-12; and wherein the urethane particles have an average aspect ratio equal to or greater than 1.5.

16. The method of claim 15, wherein the PVP having Fikentscher K value in a range from 17 to 90.

17. The method of claim 15, wherein a coated layer comprises a quantity of from 0.6% to 9% by weight of silicon dioxide particles.

18. The method of claim 15, wherein the coating mixture is free of silicone.

19. The method of claim 15, wherein the surface gloss is less than 10.

20. A film comprising:
a layer comprising a core layer comprising a biaxially stretched layer comprising a polyester and a top layer on the core layer, wherein the top layer comprises urethane particles, polyvinyl pyrrolidone (PVP), and a crosslinker;

wherein a surface gloss of the film measured on the top layer at 60° according to ASTM D523 is equal to 4-12; and wherein the urethane particles have an average aspect ratio equal to or greater than 1.5.

21. A method to form a film comprising:

stretching a polyester-containing core layer longitudinally to form a first stretched layer; applying a coating mixture comprising urethane particles, polyvinyl pyrrolidone (PVP) and a crosslinker to the first stretched layer to form a first coated layer; heating the first coated layer; stretching the first coated layer transversally to form a second coated layer; wherein a top surface of the second coated layer has a surface gloss at 60° according to ASTM D523 equal to 4-12; and wherein the film further comprises a coating of a hot melt adhesive, wherein the hot melt adhesive has a cohesive split of 50/50% within the film when approximately 1 gm of the film is coated with approximately 1/16 inch wide, approximately 0.25 g melt beads of the hot melt adhesive at 370° F.

* * * * *